(12) United States Patent
Anand et al.

(10) Patent No.: US 12,010,229 B2
(45) Date of Patent: Jun. 11, 2024

(54) DURABILITY ENFORCEMENT OF CRYPTOGRAPHIC KEYS IN A KEY MANAGEMENT SYSTEM

(71) Applicant: INTERNATIONAL BUSINESS MACHINES CORPORATION, Armonk, NY (US)

(72) Inventors: Vaijayanthimala K. Anand, Austin, TX (US); Wesley Leggette, Chicago, IL (US); Akila Srinivasan, Carpentersville, IL (US); Bruno Henriques, Cedar Park, TX (US); Cameron Paul Kurotori, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 459 days.

(21) Appl. No.: 17/329,604

(22) Filed: May 25, 2021

(65) Prior Publication Data
US 2022/0385464 A1 Dec. 1, 2022

(51) Int. Cl.
  *H04L 9/14* (2006.01)
  *G06F 9/54* (2006.01)
  *H04L 9/08* (2006.01)
(52) U.S. Cl.
  CPC ............ *H04L 9/0894* (2013.01); *G06F 9/546* (2013.01); *H04L 9/14* (2013.01)
(58) Field of Classification Search
  CPC .......... H04L 9/0894; H04L 9/14; G06F 9/546
  USPC ........................................................ 380/286
  See application file for complete search history.

(56) References Cited

U.S. PATENT DOCUMENTS

| 6,134,660 | A | 10/2000 | Boneh et al. |
| 8,295,492 | B2 | 10/2012 | Suarez et al. |
| 8,613,102 | B2 | 12/2013 | Nath |
| 9,251,097 | B1* | 2/2016 | Kumar ............... G06F 11/1076 |

(Continued)

OTHER PUBLICATIONS

Gupta et al., "EasyCommit: A Non-blocking Two-phase Commit Protocol" EDBT, 2018, 12 pages.

(Continued)

*Primary Examiner* — Kambiz Zand
*Assistant Examiner* — Phuc Pham
(74) *Attorney, Agent, or Firm* — Gavin Giraud; Andrew D. Wright; Calderon Safran & Wright, P.C.

(57) ABSTRACT

Systems and methods for enforcing durability of second level encryption keys by a key management system (KMS) are provided. In embodiment, a method includes: receiving a first request to encrypt a first level key, the request including the first level key and a second level key identification associated with a stored encrypted second level key; determining that a durability check of the encrypted second level key is required based on the request; determining a durability status of the encrypted second level key by comparing actual storage of the encrypted second level key in one or more storage locations with predetermined storage rules for a durability level of the encrypted second level key, wherein the durability status indicates that the storage of the encrypted second level key complies with the durability level; and sending a notification regarding the durability status to the data storage service.

20 Claims, 6 Drawing Sheets

(56) References Cited

U.S. PATENT DOCUMENTS

| | | |
|---|---|---|
| 10,467,422 B1* | 11/2019 | Roth ............... G06F 21/602 |
| 10,728,031 B2 | 7/2020 | Roth et al. |
| 2005/0223242 A1 | 10/2005 | Nath |
| 2008/0192940 A1 | 8/2008 | Feng et al. |
| 2009/0006860 A1 | 1/2009 | Ross |
| 2018/0336554 A1 | 11/2018 | Trotter |
| 2019/0058587 A1* | 2/2019 | Roth ............... H04L 9/0894 |
| 2021/0029096 A1* | 1/2021 | Hart ............... H04L 9/0662 |

OTHER PUBLICATIONS

Mell et al., "The NIST Definition of Cloud Computing", NIST, Special Publication 800-145, Sep. 2011, 7 pages.

* cited by examiner

DURABILITY ENFORCEMENT OF CRYPTOGRAPHIC KEYS IN A KEY MANAGEMENT SYSTEM

BACKGROUND

Aspects of the present invention relate generally to data encryption and, more particularly, to enforcing durability of cryptographic keys in a key management system.

A key management system (KMS) is a system configured to manage cryptographic keys in a cryptosystem. A KMS is generally configured to generate, rotate, store, use, destroy, and replace cryptographic keys. A data object in Object Storage, in a database, or in any other data store either in a cloud or on premise, is often encrypted at a first level with a data encryption key (e.g., DEK). In some secure data systems, a service or application that has the data object stored in encrypted form utilizes a KMS to store first level encryption keys (e.g., a data encryption key (DEK)) securely. In this type of secure data environment, the data object and the encryption keys are not stored together. In some secure data systems, a cloud service or application leverage a KMS's bring your own key (BYOK) feature, which enables a data owner to utilize their own second level keys (e.g., root of trust) to encrypt a first level encryption key and store the encrypted first level encryption key in their data storage service or application. This ensures that the data storage service not only encrypts customer data but also allows the customer to control the data through their second level key (e.g., BYOK key), and ensures that the first level key is not stored with the encrypted data. In one example, when customer data is being accessed, a data service calls a KMS to decrypt the encrypted DEK to get the DEK. In order to decrypt the DEK, the KMS uses the customer's BYOK key to decrypt the DEK. Using such systems, if a customer wants to control access to data, the customer can delete the BYOK key from the KMS, which will result in failure of the KMS to decrypt the encrypted DEK.

SUMMARY

In a first aspect of the invention, there is a computer-implemented method including receiving, by a key management service (KMS), a first request from a data storage service or an application to encrypt a first level key, the request including the first level key and a second level key identification (ID) associated with a stored encrypted second level key. The method also includes determining, by the KMS, that a durability check of the encrypted second level key is required based on the request to encrypt the first level key. Additionally, the KMS determines a durability status of the encrypted second level key by comparing actual storage of the encrypted second level key in one or more storage locations with predetermined storage rules for a durability type of the encrypted second level key. The durability status indicates that the storage of the encrypted second level key complies with the durability type. The KMS also sends a notification regarding the durability status to the data storage service in response to the first request In another aspect of the invention, there is a computer program product including one or more computer readable storage media having program instructions collectively stored on the one or more computer readable storage media. The program instructions are executable to cause a key management service (KMS) to receive a first request to encrypt a first level key in the form of an application programming interface (API) message, the request including a second level key identification (ID) associated with a stored encrypted second level key. The KMS also determines that a durability check of the encrypted second level key is required based on a flag in the request to encrypt the first level key. Additionally, the KMS determines a durability status of the encrypted second level key by comparing storage of the encrypted second level key in one or more storage locations with predetermined storage rules for a durability level of the encrypted second level key. The durability status indicates whether the storage of the encrypted second level key complies with the predetermined storage rules for the durability level. The KMS also sends a notification regarding the durability status to the data storage service in response to the first request.

In another aspect of the invention, there is system including a processor, a computer readable memory, one or more computer readable storage media, and program instructions collectively stored on the one or more computer readable storage media. The program instructions are executable to cause a data storage service to send a first API request to encrypt a first level key to a key management service (KMS), the first API request including a second level key identification (ID) and a flag indicating that a durability status of an encrypted second level key is required. The data storage service also determines, based on a notification received from an API of the KMS, whether the encrypted second level key meets a user-selected level of durability of the encrypted second level key.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to data encryption and, more particularly, to enforcing durability of cryptographic keys in a key management system. In embodiments, a Key Management Service (KMS) provides application programming interfaces (APIs) to apply a specific level of durability on a second level key, either during creation of the second level key or in an update after creation. It should be understood that the use of the term key herein refers to a cryptographic key or an encryption key. The term KMS as used herein refers to a Key Management Service configured to manage cryptographic keys in a cryptosystem, including the generation, exchange, storage, use, destruction, and/or replacement of cryptographic keys. The ability for a KMS to successfully obtain and utilize a second level key (e.g., a user-elected bring your own key (BYOK) cryptographic key) over time, despite any local or regional service or hardware outages, is referred to herein as the durability of the cryptographic key.

Encryption systems that utilize a KMS to encrypt a first level key with a second level key selected by a user (e.g., a BYOK) generally store an encrypted version of the second level key remote from data encrypted with the first level key. Sometimes, it is possible for the second level key to be deleted by accident, or with malicious intent. Additionally, there are other disasters that can destroy the customer's second level key in the KMS system itself. Without the ability to obtain the customer's second level key, the KMS system cannot decrypt the first level key, and data objects encrypted with the first level key may be inaccessible.

Different types of data may have different durability needs. For example, data may be secret (requiring high durability), confidential (requiring medium durability), or public (requiring low durability). The durability of these second level keys is important for the functioning of a data storage service. It should be understood that the term data storage service as used herein refers to a computer-based data storage service configured to encrypt data and store encrypted data based on user storage requests. A second level key requiring a high durability may be saved in at least three different regional secure databases of the KMS, for example, to significantly reduce the chances that a service or hardware failure will result in loss of the second level key. Advantageously, embodiments of the invention achieve high durable cryptographic keys to enable data storage services to meet their data durability targets. In implementations, a KMS enables a user to select a durability level (e.g., high, medium, low) of a second level key (e.g., root of trust key) used to encrypt a first level key. For example, services or applications that store highly sensitive and/or critical data may choose a highly durable second level key (e.g., close to 100% durable). Embodiments of the invention utilize a technical solution including API protocols between a data storage service and a KMS to address the technical problem of ensuring second level key durability prior to the creation of encrypted data.

In embodiments of the invention, an integrated data storage service that requires a second level key (e.g., DEK) to be highly resilient can request the durability state of the key in requests sent to the KMS by setting a flag in the requests to the primary KMS service. When the primary KMS service receives a request with the flag set, the primary KMS service checks the durability set on the second level key, and also checks if the second level key has been replicated to all the required distributed KMS service key stores and returns the state of the key on the remote KMS service in a response to the integrated data storage service. In implementations, the integrated data storage service can decide to proceed with the request a user made to the data storage service or reject the request based on the response from the primary KMS service. Specifically, for resources that require high key durability and resiliency, an integrated data storage service may reject the user request to create or update a resource on the integrated data storage service if the primary KMS server gives an indication that the distributed remote KMS services do not have the latest version or state of the second level key.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
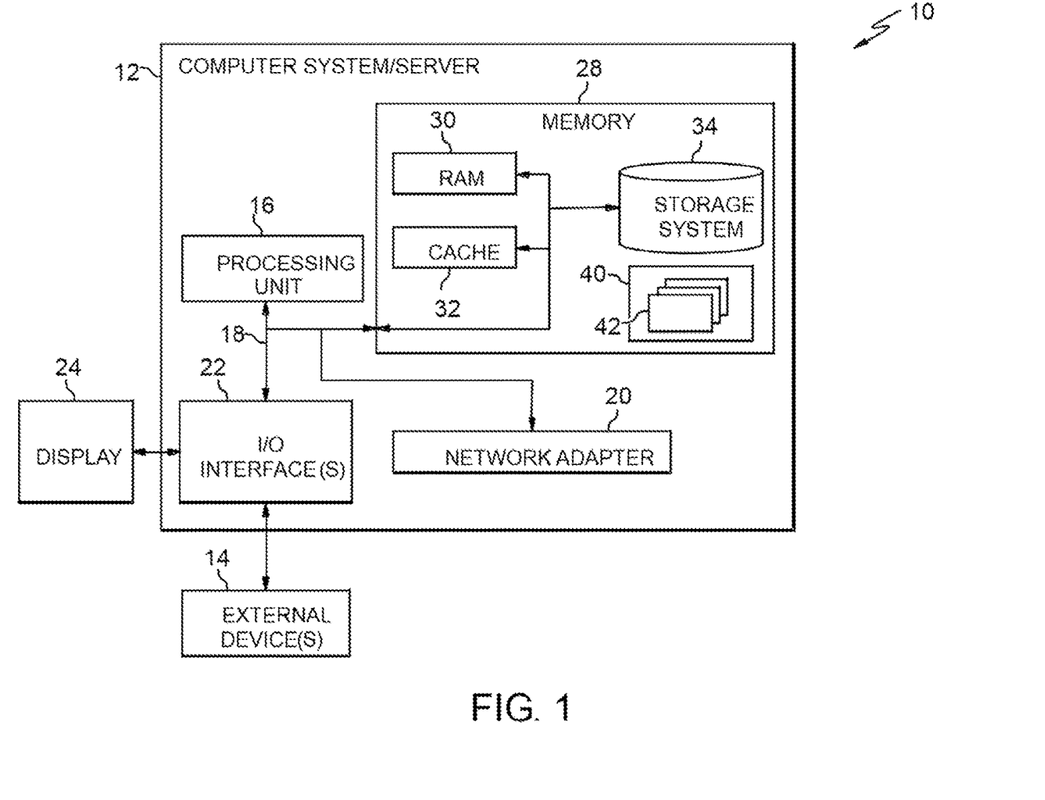
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
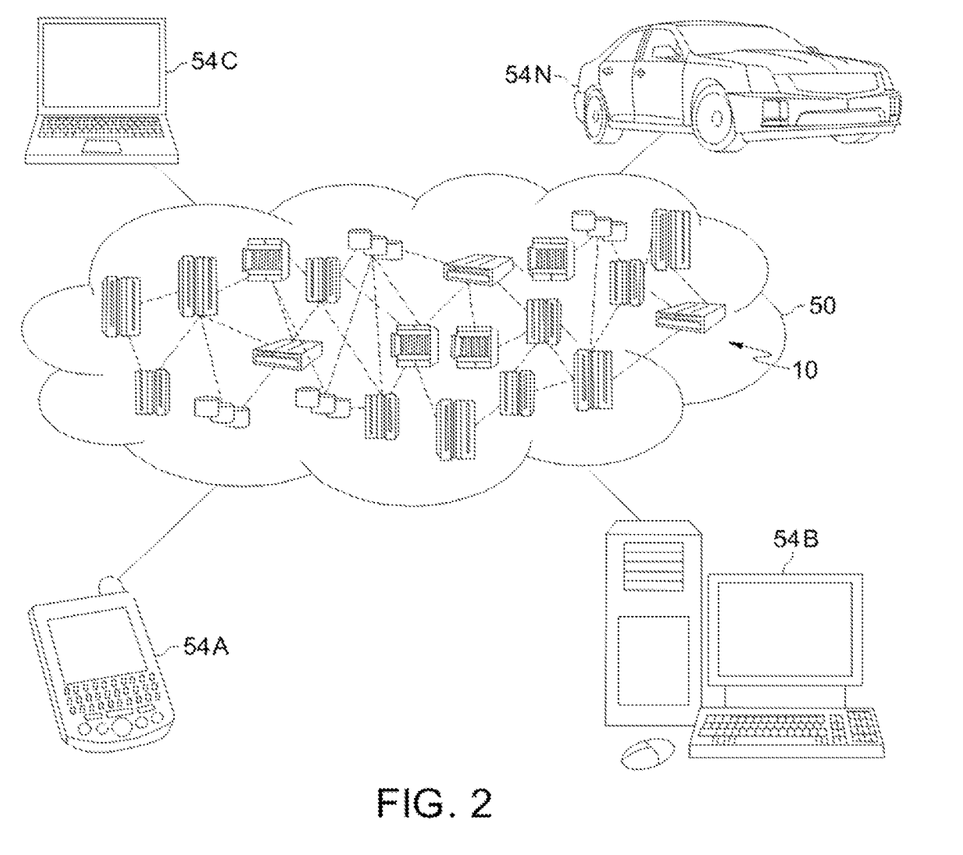
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
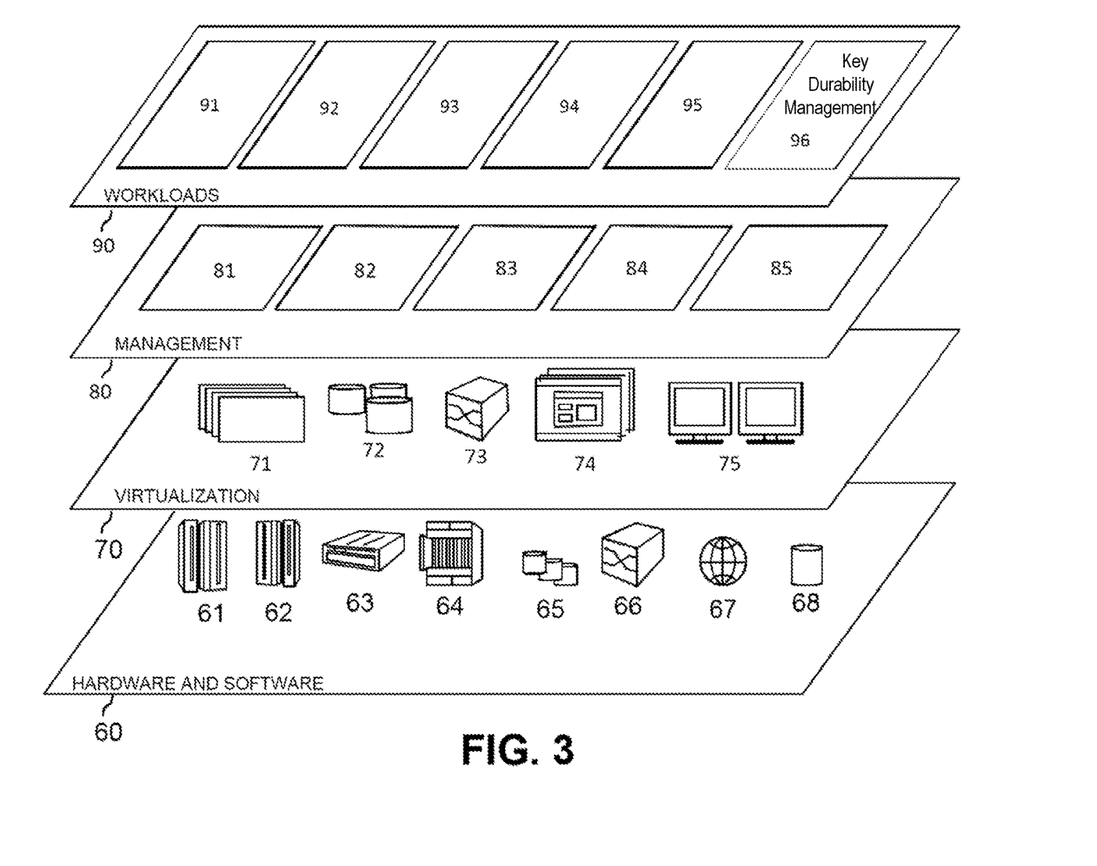
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and key durability management 96.

Implementations of the invention may include a computer system/server 12 of FIG. 1 in which one or more of the program modules 42 are configured to perform (or cause the computer system/server 12 to perform) one or more functions of the key durability management 96 of FIG. 3. For example, the one or more of the program modules 42 may be configured to: receive a first request from a data storage service to encrypt a first level key with a second level key; determine that a durability check of an encrypted second level key is required based on the request; determine a durability status of the encrypted second level key by comparing actual storage of the encrypted second level key in one or more storage locations with predetermined storage rules for a durability type of the encrypted second level key to determine that the storage of the encrypted second level key complies with the durability type; and send a notification regarding the durability status to the data storage service in response to the first request.

Figure 4:
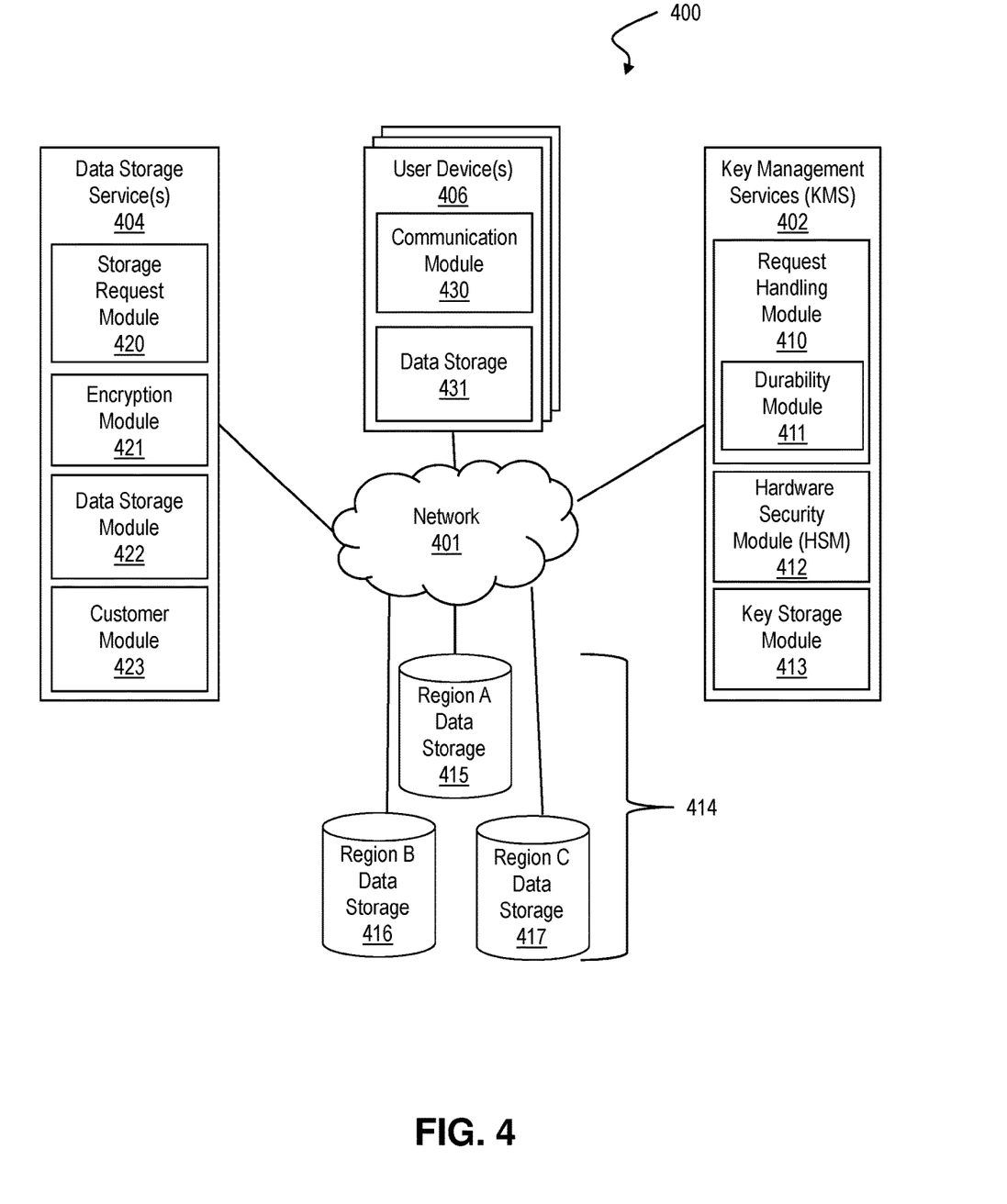
FIG. 4 shows a block diagram of an exemplary environment in accordance with aspects of the invention.

FIG. 4 shows a block diagram of an exemplary environment in accordance with aspects of the invention. In embodiments, a data encryption environment 400 includes a network 401 interconnecting a KMS 402 with one or more data storage service 404 and one or more user devices 406.

In embodiments, the KMS 402 comprises one or more computer systems including elements of the computer system 12 depicted in FIG. 1. In implementations, the KMS 402 comprises one or more modules, each of which may comprise one or more program modules such as program modules 42 described with respect to FIG. 1. In the example of FIG. 4, the KMS 402 includes one or more of: a request handling module 410, a durability module 411, a hardware security module (HSM) 412 and a key storage module 413 for storing encrypted second level keys in one or more data storage locations 414 (e.g., Region A data storage 415, Region B data storage 416, and Region C data storage 417) of the KMS 402, wherein each of the modules may comprise one or more program modules 42 of FIG. 1. In embodiments of the invention, the request handling module 410 is configured to handle requests (e.g., API requests) from one or more user devices 406 and one or more data storage services 404; the durability module 411 is configured to determine a durability state of encrypted second level keys; the HSM 412 is configured to safeguard and manage digital keys, and perform encryption and decryption functions; and the key storage module 413 is configured to store encrypted second level keys according to predetermined durability rules and requirements. The term HSM as used herein refers to a special-purpose physical computing device that safeguards and manages digital keys and performs encryption and decryption functions in accordance with one of more program modules of the HSM (e.g., program modules 42 of FIG. 1). The HSM 412 may be in the form of a plug-in card or an external device that attaches directly to a computer or network server, for example. The HSM 412 may contain one or more secure crypto processor chips, and include features that provide tamper evidence.

The data storage locations 414 of the KMS 402 may each comprise one or more data storage resources, wherein each data storage location is at a distinct physical or geographic location. In the example of FIG. 4, the data storage locations 414 are shown as the Region A data storage 415, Region B data storage 416, and Regions C data storage 417, which are each located in a different geographic region. However, the data storage locations 414 are not limited to the examples shown.

The network 401 may comprise an intranet, the Internet, or a combination of the two, for example. In aspects of the invention, the KMS 402 comprises a computing node 10 in the cloud based environment 50 of FIG. 2. In implementations, the KMS 402 is configured to provide cloud-based key management services to consumers and data storage services 404 via the network 401. Additionally, the KMS 402 may be located remote from the data storage service 404 and the user devices 406 (e.g., on a cloud network), or may be co-located with the data storage service 404 on an internal business network.

In embodiments, the one or more data storage services 404 each comprise one or more computer systems including elements of the computer system 12 depicted in FIG. 1. In implementations, each data storage service 404 may comprise one or more modules, each of which may comprise one or more program modules such as program modules 42 described with respect to FIG. 1. In the example of FIG. 4, an exemplary data storage service 404 includes one or more of: a storage request module 420; an encryption module 421; a data storage module 422; and a customer module 42, each of which may comprise one or more program modules 42 of FIG. 1. In embodiments of the invention, the storage request module 420 is configured to handle storage requests from one or more user devices 406; the encryption module 421 is configured to encrypt data to be stored, and communicate with the KMS 402; the data storage module 422 is configured to create storage containers (e.g., a storage bucket) and save encrypted data to the created storage containers; and the customer module 423 is configured to store user information. In implementations, the one or more data storage services 404 each comprise a computing node 10 in the cloud based environment 50 of FIG. 2. In implementations, the one or more data storage services 404 are each configured to provide cloud-based data storage services to users via the network 401.

The user devices 406 may each include elements of the computer system 12 depicted in FIG. 1. In implementations, the user devices 406 comprise local computing devices used by cloud consumers, such as, for example, the personal digital assistant (PDA) or cellular telephone 54A, the desktop computer 54B, or the laptop computer 54C FIG. 2.

The KMS 402, data storage service 404 and user device 406, may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
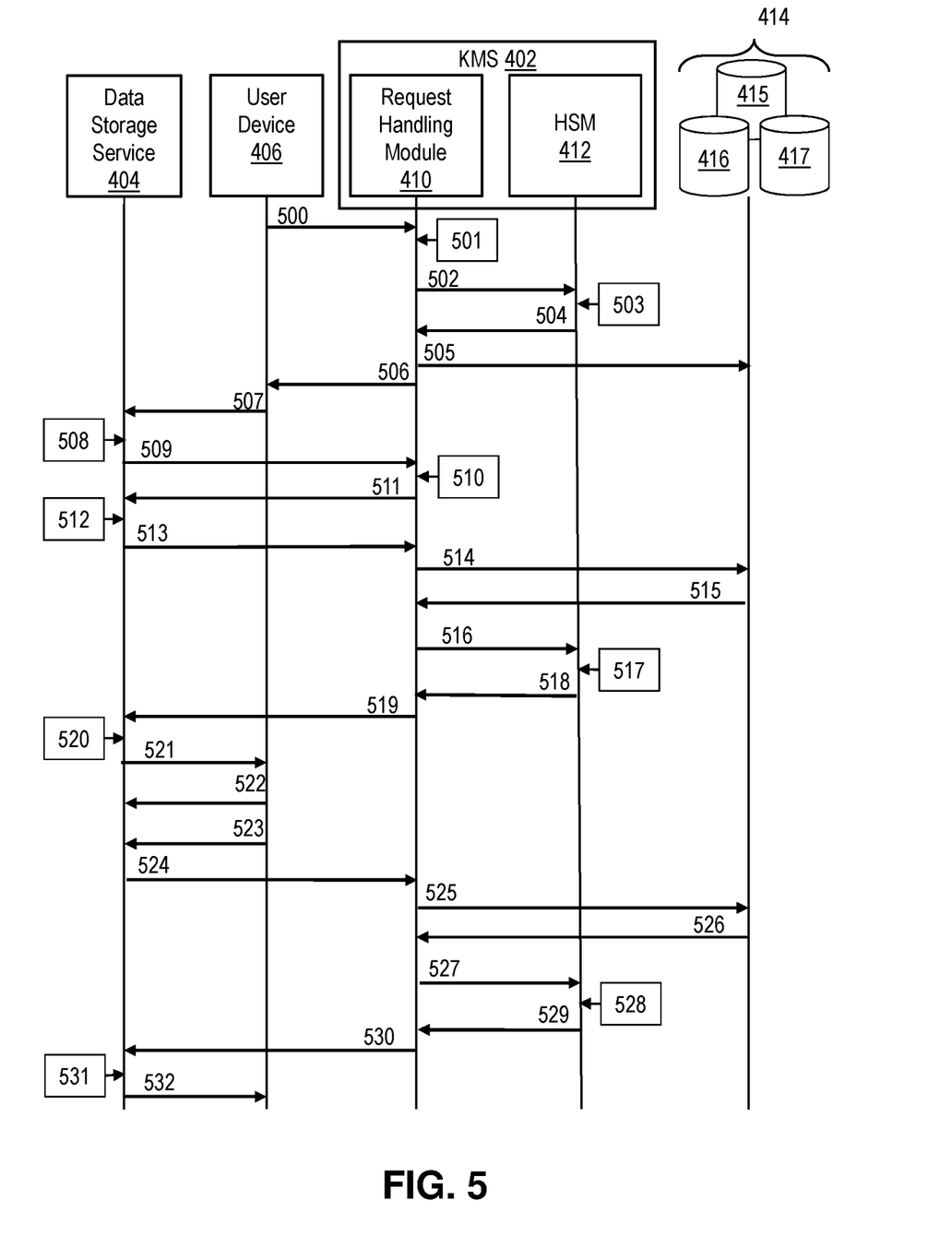
FIG. 5 shows a flow diagram illustrating exemplary method steps in accordance with aspects of the invention.

FIG. 5 shows a flow diagram illustrating exemplary method steps in accordance with aspects of the present invention. Steps of the method may be carried out in the environment 400 of FIG. 4 and are described with reference to elements depicted in FIG. 4.

Creation of a Storage Container

At step 500 the user device 406 sends a request to the KMS 402 to create a second level key (e.g., root key), wherein the request includes a type or level of durability desired (e.g., secure, confidential, or public; or high, medium, or low durability). In implementations, the KMS 402 provides a user interface which enables the user to select from a group of available durability types or levels. In embodiments, the communication module 420 of the user device 406 implements step 500, and the request is received by the request handling module 410 of the KMS 402. In aspects of the invention, the KMS 402 provides APIs to apply a specific level of durability on a second level key, either during creation of the key, or during an update of the key after creation. In certain embodiments, the user device 406 can also request the KMS 402 to generate a first level key (e.g., a data encryption key (DEK)) in addition to the second level key.

At step 501, the KMS 402 generates a second level key identification (ID) associated with the second level key to be created, and saves the second level key ID in a database of the KMS 402. In embodiments, the request handling module 410 of the KMS 402 implements step 501. The second level key ID may be any combination of numbers, letters, and/or symbols enabling the KMS 402 to identify an associated encrypted second level key. In implementations, the second level key ID includes an indication of the type or level of durability desired by the user.

At step 502 the request handling module 410 of the KMS 402 instructs the HSM 412 of the KMS 402 to create the second level key based on the request of step 500. In implementations, the HSM 412 is a special-purpose hardware device in communication with the request handling module 410 of the KMS 402, and provides tamper-prevention and tamper-recording functions. In certain embodiments, the request handling module 410 of the KMS 402 also instructs the HSM 412 of the KMS 402 to create the first level key based on the request of step 500.

At step 503 the HSM 412 of the KMS 402 creates the second level key (e.g., root key) and encrypts the second level key with a third level key (e.g., master key). In embodiments, the third level key is only known to the HSM 412 of the KMS 402, and the third level key is unknown to the request handling module 410 of the KMS 402, the user (e.g., user device 406), and the data storage service 404. In aspects of the invention, only the HSM 412 of the KMS 402 knows the second level key, and the second level key is unknown to the user (e.g., user device 406) and the data storage service 404. In certain embodiments, the HSM 412 of the KMS 402 also creates the first level key (e.g., DEK) at step 503.

At step 504, the HSM 412 of the KMS 402 sends the encrypted second level key to the request handling module 410 of the KMS 402. In implementations, the encrypted second level key is known to the KMS 402 (e.g., the request handling module 410 of the KMS 402), but is not known to the user (e.g., user device 406) or data storage service 404. In certain embodiments, the HSM 412 of the KMS 402 also sends the first level key to the request handling module 410 of the KMS 402 at step 504.

At step 505 the KMS 402 saves the encrypted second level key in one or more data storage locations 414 according to the type or level of durability desired, as indicated in the request to create the second level key. In implementations, the KMS 402 utilizes stored predetermined rules associated with different type or levels of durability to determine the manner in which the encrypted second level key is to be stored. In one example, the KMS 402 determines that the encrypted second level key requires a high durability, and saves the encrypted second level key in multiple regional storage locations (e.g., Region A data storage 415, Regions B data storage 416 and Region C data storage 417) according to predetermined storage rules for a high durability type of key. In implementations, the key storage module 413 of the KMS 402 determines the type of storage required for the durability type or level, and stores the encrypted second level key in accordance with step 505.

At step 506, the KMS 402 returns the second level key ID to the user device 406 in response to the request of step 500. In embodiments, the request handling module 410 of the KMS 402 returns the second level key ID to the communication module 430 of the user device 406, and the communication module 430 stores the second level key ID in a database of the user device 406 (e.g., data storage 431). In certain embodiments, the KMS 402 also returns the first level key generated by the HSM 412 of the KMS 402 to the user device 406 in response to the request of step 500.

At step 507 the user device 406 sends a request to create a storage container (e.g., a storage bucket) to the data storage service 404, wherein the request includes the second level key ID. In implementations, the request also includes the type or level of durability desired. Embodiments, the request to create a storage container is a request to create a cloud-storage bucket. The term cloud-storage bucket as used herein refers to a basic container that holds data in a cloud storage environment (e.g., in a dispersed storage network (DSN)). In general, a cloud storage bucket can be utilized to organize data and control access to the data. In certain embodiments, the request to create a storage container may also contain the first level key.

In embodiments, at step 508, if the first level key has not been provided to the data storage service 404, the data storage service 404 creates a first level key (e.g., data encryption key (DEK)) in response to the request of step 504. In implementations, the encryption module 420 of the data storage service 404 implements step 508. In an alternative embodiment, the data storage device 404 does not receive a first level key from the user device 406 and does not create the first level key at step 508, but instead requests the KMS 402 to generate a first level key at step 509.

In embodiments, at step 509 the data storage service 404 sends a first request to encrypt the first level key to the request handling module 410 of the KMS 402, wherein the request includes the first level key and the second level key ID. In an alternative embodiment, at step 509 the data storage service 404 sends a first request to generate and encrypt a first level key to the request handling module 410 of the KMS 402, wherein the request includes the second level key ID. In embodiments, the first request includes an indication that a durability status of the encrypted second level key is needed.

In embodiments, the first request of step 509 includes a flag indicating a request to check a durability status of the encrypted second level key. In implementations, the first request is in the form of an API message. In embodiments, the data storage service 404 identifies the user requesting the creation of the storage container (e.g., via login, by identifying information in the first request, or other method). In implementations, the data storage service 404 determines that a durability check is required based on either an identification of the user, or based on an indication in the request of step 507 that a durability check is required, and sets the flag in the first request accordingly. In aspects of the invention, the second level key ID includes an indication that a durability check is required (e.g., an indication that a high durability level has been selected by the client at step 500). In embodiments, the flag includes a durability level associated with the encrypted second level key.

At step 510 the request handling module 410 of the KMS 402 determines that a durability status is required based on the first request of step 509. In implementations, the request handling module 410 determines that the durability status is required based on the presence of a flag in the first request of step 509. In aspects of the invention, the request handling module 410 of the KMS 402 determines if the storage of the encrypted second level key meets a predetermined threshold for the type or level of durability desired (e.g., a minimum of three different regional storage devices for a high level of durability) based on stored predetermined rules. In embodiments, the request handling module 410 comprises an API for handling encryption requests. In implementations, the durability module 411 of the request handling module 410 is configured to determine if the storage of the encrypted second level key meets the predetermined threshold for the type or level of durability according to step 510. In embodiments, the request handling module 410 compares the manner in which the encrypted second level key is actually stored with predetermine storage rules associated with the user-selected durability type. In aspects of the invention the request handling module 410 determines how the second level key is actually stored by communicating (e.g., sending an inquiry regarding the storage location(s) of the encrypted second level key) with one or more data storage locations 414 (e.g., a storage manager of data stores at a data storage location), or based on saved storage data from the key storage module 413. In one example, the request handling module 410 of the KMS 402 determines that a flag is present in the request of step 509, determines that the flag and/or the second level ID indicates a high durability level was selected, and the durability module 411 determines that the encrypted second level key associated with the second level ID was saved in Region A data storage 415, Regions B data storage 416 and Region C data storage 417, and thus complies with stored rules requiring that a high durability level key be stored in at least three different regional locations. In this case, the request handling module 410 of the KMS 402 would determine that the encrypted second level key does meet the standards for the selected high durability level.

At step 511 the request handling module 410 of the KMS 402 sends a notification regarding the type or level of durability in response to the first request of step 509. In aspects of the invention, the notification provides information regarding a durability state of the encrypted second level key (e.g., the number of storage regions the encrypted key has been stored at). In implementations, the notification comprises an indication that the encrypted second level key complies with requirements associated with the durability type or level selected by the user. In alternative embodiments, the notification comprises an indication that the encrypted second level key does not comply with requirements associated with the durability type or level selected by the user. This situation is discussed below with respect to FIG. 6.

At step 512 the data storage service 404 determines that the encrypted second level key meets the requirements for the type or level of durability desired by the user based on the notification of step 511. In implementations, the encryption module 421 of the data storage service 404 receives the notification from the KMS 402 according to step 511, and determines based on the notification that the durability requirements are met and the creation of the storage container can proceed.

At step 513 the data storage service 404 sends a second request to encrypt the first level key to the request handling module 410 of the KMS 402, wherein the second request includes the second level key ID, but no flag indicating a request to check a durability level of the second level key. In implementations, the second request also includes the first level key. In embodiments, the second request is in the form of an API message. In embodiments, when a first level key has not yet been generated, the second request also includes a request to generate and encrypt the first level key.

Because there is no flag to initiate a durability status check, the request handling module 410 of the KMS 402 proceeds to initiate the encryption of the first level key at step 514 by sending a request to one or more data storage locations 414 to retrieve the encrypted second level key. In embodiments, the request handling module 410 comprises an API for handling encryption requests. In one example, the KMS 402 identifies the encrypted second level key based on the second level key ID of the second request, determines that the encrypted second level key is stored in Region A data storage 415, Regions B data storage 416 and Region C data storage 417, based on data stored by the key storage module 413 of the KMS 402, and requests a copy of the encrypted second level key from the Region A data storage 415.

At step 515, the one or more data storage locations 414 receive the request from the KMS 402 of step 514, and send the request handling module 410 of the KMS 402 the encrypted second level key in response.

At step 516, the request handling module 410 of the KMS 402 sends the first level key (received with the second request of step 513) and the encrypted second level key to the HSM 412, for encryption of the first level key by the second level key. In alternative embodiments, when a first level key has not yet been generated, the KMS 402 sends a request to the HSM 412 to generate and encrypt the first level key based on the second request, along with the encrypted second level key.

At step 517, the HSM 412 decrypts the encrypted second level key (received from the request handling module 410 at step 516) using the third level key (e.g., master key) stored with the HSM 412 to obtain the second level key, encrypts the first level key utilizing the decrypted second level key, and deletes the decrypted second level key within a predetermined time period. In certain embodiments, the HSM 412 also generates the first level key before encrypting the first level key with the decrypted second level key.

At step 518, the HSM 412 of the KMS 402 provides the encrypted first level key to the request handling module 410 of the KMS 402. In certain embodiments, the HSM 412 also provides the first level key to the request handling module 410.

At step 519, the request handling module 410 of the KMS 402 sends the encrypted first level key to the data storage service 404 in response to the request of step 513. In certain embodiments, the request handling module 410 of the KMS 402 also returns the first level key to the data storage service 404 in response to the request of step 513.

At step 520, the data storage service 404 completes the creation of the storage container requested at step 504, and stores the encrypted first level key. In implementations, the data storage service 404 saves the encrypted first level key in the created storage container. In certain embodiments, the data storage service 404 saves the first level key. In embodiments, the data storage module 422 of the data storage service implements step 520.

At step 521 the data storage service 404 sends a notification to the user device 406 that the requested storage container has been created. In embodiments, the storage request module 420 of the data storage service 404 implements step 521.

At step 522 the user device 406 sends data to the data storage service 404 for encryption by the data storage service 404 utilizing the first level key, wherein the encrypted data is then storage in the created storage container. In implementations, the communication module 430 of the user device 406 sends data stored in the data storage 431 to the data storage service 404 for encryption by the encryption module 421 and storage by the data storage module 422 in the created storage container. At this point, the user request of step 500 has been completed, and encrypted data is stored within a created storage container.

Unless otherwise required by the steps discussed above, it should be understood that steps shown in FIG. 5 may be performed in a different order than the one depicted in FIG. 5. For example, unless otherwise required by the steps described herein, certain steps of the user device 406 and/or data storage device 404 may be performed concurrently with steps of the KMS 402.

Since the durability check of the second level key can incur additional latency in a data storage process, embodiments of the invention include a flexible interface that enables the data storage service 404 to determine when to invoke the KMS 402 durability check based on predetermined rules (e.g., a service-level agreement (SLA)) of the data storage service. In one example, a cloud-based data storage service 404 has high SLAs for cross regional data stores (buckets). Thus, the cloud-based data storage service 404 may choose to only invoke the durability check for the cross regional buckets. In this manner, data service SLAs and specifically data durability requirements can be met while also minimizing latency impacts.

Accessing Stored Encrypted Data

When a user wishes to access the encrypted data stored in their storage container (e.g., storage bucket), they need to follow a decryption process to access the encrypted data. The following is an example of steps for accessing encrypted data.

At step 523, the user device 406 sends a request for data to the data storage service 404, wherein the data is the encrypted data stored in the storage container created at step 520.

At step 524 the data storage service 404 sends a request to decrypt the encrypted first level key to the request handling module 410 of the KMS 402, wherein the request includes the encrypted first level key and the second level key ID.

At step 525, the KMS 402 identifies where the encrypted second level key is stored based on the second level key ID and/or stored data, and sends a request to one or more data storage locations 414 to retrieve the encrypted second level key. In implementations, the request handling module 410 of the KMS 402 receives the request of step 524 and the key storage module 413 of the KMS 402 retrieves the encrypted second level key in accordance with step 525.

At step 526, the one or more data storage locations 414 send the encrypted second level key to the KMS 402 in response to the request of step 525. In embodiments, the one or more data storage locations 414 send the encrypted second level key to the request handling module 410 of the KMS 402.

At step 527, the request handling module 410 of the KMS 402 sends the encrypted first level key to the HSM 412 for decryption.

At step 528, the HSM 412 decrypts the encrypted second level key using the stored third level key (e.g., master key), decrypts the encrypted first level key utilizing the decrypted second level key, and deletes the decrypted second level key within a predetermined time period.

At step 529 the HSM 412 of the KMS 402 returns the decrypted first level key to the request handling module 410 of the KMS 402.

At step 530, the request handling module 410 of the KMS 402 returns the decrypted first level key to the data storage service 404 in response to the request of step 523. In implementations, the request handling module 410 returns the decrypted first level key to the encryption module 421 of the data storage service 404.

At step 531, the data storage service 404 decrypts the data stored in the storage container using the decrypted first level key, and deletes the first level key after a predetermined period of time. In implementations, the encryption module 421 of the data storage service 404 implements step 531.

At step 532, the data storage service 404 provides the decrypted data from the storage container to the user in response to the request of step 523. In implementation, the data storage module 422 of the data storage service 404 enables the user to access the decrypted data, or sends the decrypted data to the user device 406.

Figure 6:
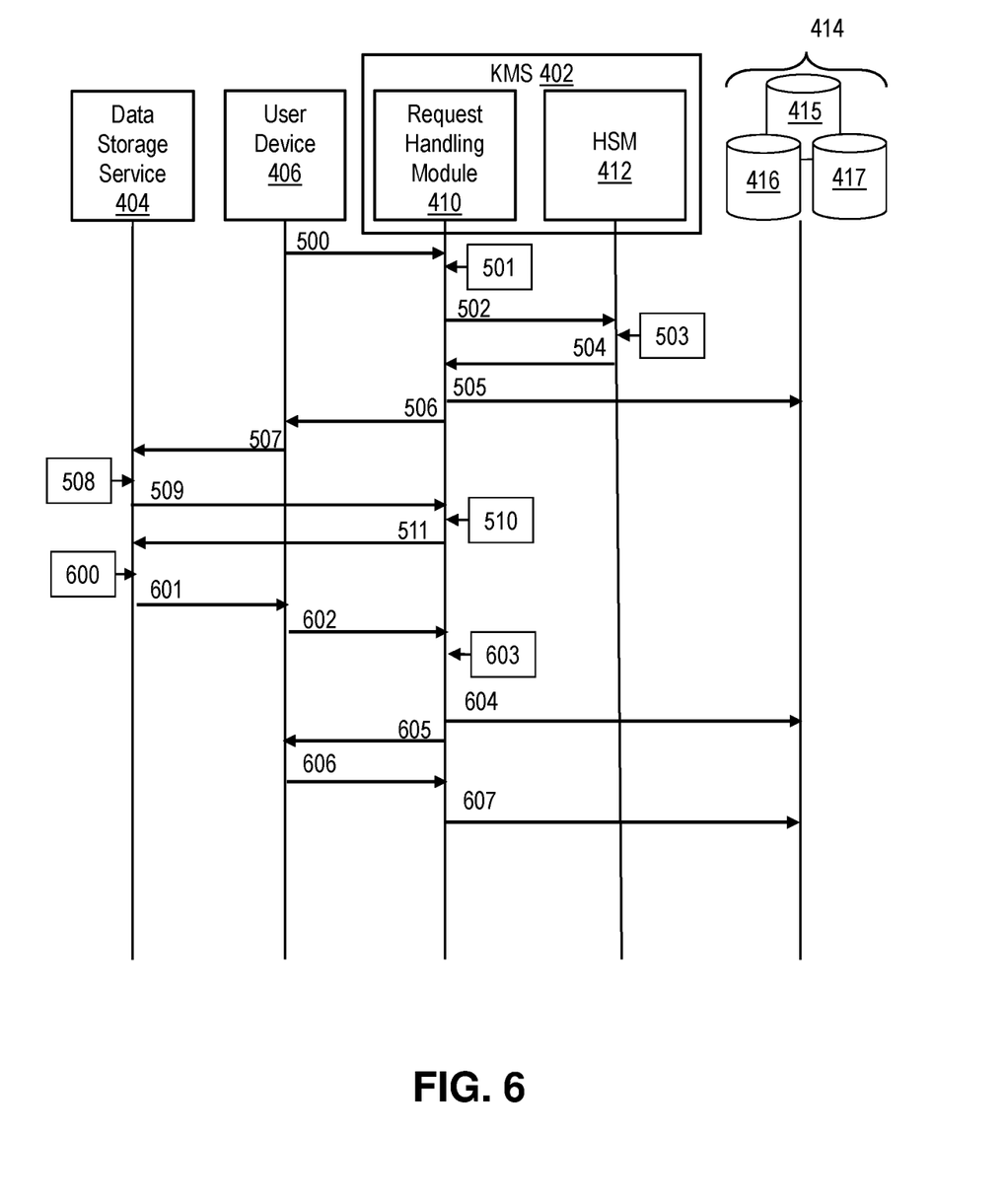
FIG. 6 shows a flow diagram illustrating exemplary method steps in accordance with aspects of the invention.

FIG. 6 shows a flow diagram illustrating exemplary method steps in accordance with aspects of the present invention. Steps of the method may be carried out in the environment 400 of FIG. 4 and are described with reference to elements depicted in FIG. 4. FIG. 6 includes method steps that occur when a desired durability type or level is not met by current conditions of the KMS 402.

Steps 500 through 511 are the same as those discussed above with respect to FIG. 5. However, unlike at step at 512 in FIG. 5 wherein the data storage service 404 determines that the type or level of durability indicated meets the requirements for the type or level of durability desired by the user based on the notification of step 511, at step 600 of FIG. 6, the data storage service 404 determines that the type or level of durability of the encrypted second level key does not meet the requirements for the type or level of durability desired by the user. In implementations, the encryption module 421 of the data storage service 404 receives the notification from the KMS 402 according to step 511, and determines based on the notification that the durability requirements are not met, and the creation of the storage container (and the encryption of the first level key) cannot proceed. In embodiments, the determination that the creation of the storage container cannot proceed is based on stored rules, such as SLAs indicating that certain durability requirements must be met. In aspects of the invention, the data storage service 404 may determine that the type or level of durability has not been met when a notification from the KMS 402 indicates that the encrypted second level key is not up-to-date (e.g., does not match the second level key ID provided by the user).

At step 601 the data storage service 404 sends a notification to the user device 406 indicating that the storage container cannot be generated based on the determination at step 600. In implementations, the storage request module 422 of the data storage service 404 implements step 601. Advantageously, the decision to stop the creation of the storage container prevents data from being encrypted and stored by the data storage service 404 when the data cannot then be decrypted later (e.g., due to an outdated second level key ID or failed encrypted second level key data store).

Optionally, the user device can repeat step 507, and the data storage service 404 can repeat steps 508-511 in response, until the data storage service 404 determines that the type or level of durability of the encrypted second level key meets the requirements for the type or level of durability desired by the user according to step 511 of FIG. 5, wherein steps 512-532 of FIG. 5 may commence.

Optionally, at step 602, the user device 406 sends a status request to the request handling module 410 of the KMS 402 regarding the durability status of the encrypted second level key based on receiving the notification of the data storage service 404 indicating that the storage container cannot be generated. In implementations, the status request includes the second level key ID, and a request to determine the durability status of the second level key.

At step 603, the request handling module 410 of the KMS 402 determines whether the encrypted second level key meets the type or level of durability desired by the user (e.g., whether the encrypted second level key is stored in at least three distinct regional storage devices) in response to the status request. In implementations, the durability module 411 of the request handling module 410 identifies the encrypted second level key based on a second level key ID in the status request, and determines where the encrypted second level key is stored based on data from the key storage module 413 of the KMS 402, or based on an inquiry sent to the one or more data storage locations 414 asking for the storage location(s) of the encrypted second level key.

Optionally, at step 604, if the request handling module 410 of the KMS 402 determines that the encrypted second level key does not meet the type or level of durability desired by the user, the request handling module 410 initiates remediation actions in order to obtain the desired durability status for the encrypted second level key. In one example, the remediation actions include automatically storing the encrypted second level key in additional data storage locations so that the storage of the encrypted second level key complies with predetermined storage rules for the type or level of durability desired by the user.

At step 605, the request handling module 410 of the KMS 402 sends a status notification to the user device 406 in response to the status request of step 602 (e.g., a notification indicating that the encrypted second level key has been stored based on predetermined rules, a notification indicating that the user should try again to create the storage container, or a notification that a new second level key should be generated). In implementations, the notification indicates that the storage requirements for the durability level or type associated with the second level key has not been met (e.g., the durability status is non-compliant).

Optionally, the user can initiate the generation of a new second level key by repeating step 500 based on the status notification received from the KMS 402. In one example, the KMS 402 may indicate in the status notification that the encrypted second level key cannot be found in the one or more data storage locations 414 (e.g., Region A data storage 415, Region B data storage 416, and Region C data storage 417) of the KMS 402. In this example, the user can initiate the generation of a new second level key for use in encrypting and storing new data or recovered data.

Optionally, at step 606, user device 406 or the data storage service 404 can request an update to the second level key, wherein the request includes the second level key ID. In embodiments the request also includes a desired durability level or type.

At step 607, in response to the request of step 606, the KMS 402 updates the storage of the encrypted second level key based on the request of step 606. In one example, the request handling module 410 of KMS 402 sends instructions to the one or more data storage locations 414 to copy the encrypted second level key to one or more additional data storage locations based on predetermined rules for the desired durability level or type indicated in the request. In this example, the durability level selected by the user is high, and the predetermined rules require the encrypted second level key to be duplicated to at least three distinct data storage locations. Thus, the KMS 402 will initiate necessary functions to store a copy of the encrypted second level key in Region A data storage 415, Region B data storage 416, and Region C data storage 417.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
    receiving, by a key management service (KMS), a first request from a data storage service or an application to encrypt a first level key, the request including the first level key and a second level key identification (ID) of a stored encrypted second level key, and a flag indicating a durability type;
    determining, by the KMS, that a durability check of the encrypted second level key is required based on the durability type indicated by the flag of the request to encrypt the first level key;
    determining, by the KMS, a durability status of the encrypted second level key by comparing actual storage of the encrypted second level key in one or more storage locations with predetermined storage rules for a durability type of the encrypted second level key, wherein the durability status indicates that the storage of the encrypted second level key complies with the durability type; and
    sending, by the KMS, a notification regarding the durability status to the data storage service in response to the first request.

2. The computer implemented method of claim 1, wherein the first request is in the form of an application programming interface (API) message, wherein the durability type is a type selected from the group consisting of: secret, confidential, and public.

3. The computer implemented method of claim 1, further comprising:
    receiving, by the KMS, a request from a user device to create a second level key, the request including the durability type;
    sending, by the KMS, the second level key ID to the user device in response to the request to create the second level key, wherein the second level key ID is associated with the second level key to be created;
    creating, by the KMS, the second level key;
    encrypting, by the KMS, the second level key with a third level key, thereby generating the encrypted second level key; and
    storing, by the KMS, the encrypted second level key at the one or more data storage locations based on the predetermined storage rules associated with the durability type.

4. The computer implemented method of claim 3, wherein the second level key and the third level key are only known to a hardware security module (HSM) of the KMS, and the creating the second level key and the encrypting the second level key are performed by the HSM.

5. The computer implemented method of claim 3, further comprising:
    receiving, by the KMS, a second request from the data storage service to encrypt the first level key, the second request including the first level key and the second level key ID associated with the stored encrypted second level key;
    sending, by the KMS, a request to the one or more storage locations for the encrypted second level key;
    receiving, by the KMS, the encrypted second level key from the one or more storage locations;
    decrypting, by the KMS, the encrypted second level key with the third level key, thereby obtaining the second level key;
    encrypting, by the KMS, the first level key with the second level key, thereby generating an encrypted first level key; and
    sending, by the KMS, the encrypted first level key to the data storage service.

6. The computer implemented method of claim 1, wherein the KMS includes software provided as a service in a cloud environment.

7. A computer program product comprising one or more computer readable storage media having program instructions collectively stored on the one or more computer readable storage media, the program instructions executable to cause a key management service (KMS) to:
    receive a first request to encrypt a first level key in the form of an application programming interface (API) message, the request including a second level key identification (ID) of a stored encrypted second level key, and a flag indicating a durability level;
    determine that a durability check of the encrypted second level key is required based on the durability level indicated by the flag in the request to encrypt the first level key;
    determine a durability status of the encrypted second level key by comparing storage of the encrypted second level key in one or more storage locations with predetermined storage rules for a durability level of the encrypted second level key, wherein the durability status indicates whether the storage of the encrypted second level key complies with the predetermined storage rules for the durability level; and send a notification regarding the durability status to the data storage service in response to the first request.

8. The computer program product of claim 7, wherein the durability level of the encrypted second level key is a level selected from the group consisting of: secret, confidential, and public, and wherein the program instructions are further executable to cause the KMS to: when the durability status indicates that the storage of the encrypted second level key does not comply with the predetermined storage rules for the durability level indicated in the flag, send the notification regarding the durability status to the data storage service, wherein the notification includes an indication that the durability of the encrypted second level key is non-compliant.

9. The computer program product of claim 8, wherein the program instructions are further executable to cause the KMS to: automatically initiate storage of the encrypted second level key at one or more additional data storage locations based on the predetermined storage rules for the durability level, such that the durability of the encrypted second level key is made compliant.

10. The computer program product of claim 8, wherein the program instructions are further executable to cause the KMS to:
receive a request from a user device to create a second level key, the request including the durability level;
send the second level key ID to the user device in response to the request to create the second level key, wherein the second level key ID is associated with the second level key to be created;
create the second level key;
encrypt the second level key with a third level key, thereby generating the encrypted second level key; and
store the encrypted second level key at the one or more data storage locations based on the predetermined storage rules associated with the durability level.

11. The computer program product of claim 10, wherein the second level key and the third level key are only known to a hardware security module (HSM) of the KMS, and the creating the second level key and the encrypting the second level key are performed by the HSM.

12. The computer program product of claim 10, wherein the program instructions are further executable to cause the KMS to:
receive a second request from the data storage service to encrypt the first level key, the second request including the second level key ID associated with the stored encrypted second level key;
send a request to the one or more storage locations for the encrypted second level key;
receive the encrypted second level key from the one or more storage locations;
decrypt the encrypted second level key with the third level key, thereby obtaining the second level key;
encrypt a first level key with the second level key, thereby generating an encrypted first level key; and
send the encrypted first level key to the data storage service in response to the second request.

13. The computer program product of claim 12, wherein the second request further comprises a request to generate the first level key, wherein computer program instructions are further executable to cause the KMS to: generate the first level key.

14. A system comprising:
a processor, a computer readable memory, one or more computer readable storage media, and program instructions collectively stored on the one or more computer readable storage media, the program instructions executable to cause a data storage service to:
send a first API request to encrypt a first level key to a key management service (KMS), the first API request including a second level key identification (ID) and a flag indicating a durability type;
determine, based on the durability type indicated by the flag, that a durability check of the encrypted second level key is required; and
determine, based on a notification received from an API of the KMS and an outcome of the durability check, whether the encrypted second level key meets a user-selected level of durability of the encrypted second level key.

15. The system of claim 14, wherein the program instructions are further executable to cause the data storage service to:
receive a request to create a storage container from the user device; and
create a first level key in response to the request to create the storage container,
wherein the first API request further includes the first level key.

16. The system of claim 15, wherein the program instructions are further executable to cause the data storage service to:
upon determining that the encrypted second level key meets the user-selected level of durability of the encrypted second level key, send a second API request to encrypt the first level key to the KMS, the second API request including the second level key ID and the first level key; and
receive an encrypted first level key from the KMS in response to the second API request.

17. The system of claim 16, wherein the program instructions are further executable to cause the data storage service to:
complete the creation of the storage container;
receive data to be stored from the user device;
encrypt the data utilizing the first encryption key, thereby generating encrypted data; and
store the encrypted data in the storage container.

18. The system of claim 17, wherein the second level key and a third level key utilized by the KMS to encrypt the second level key are only known to a hardware security module (HSM) of the KMS.

19. The system of claim 15, wherein the program instructions are further executable to cause the data storage service to: upon determining that the encrypted second level key does not meet the user-selected level of durability of the encrypted second level key, send a notification to the user device indicating that creation of the storage container cannot be completed.

20. The system of claim 15, wherein the program instructions are further executable to cause the data storage service to:
upon determining that the encrypted second level key does not meet the user-selected level of durability of the encrypted second level key, send another API request to encrypt the first level key to the KMS, the other API request including the second level key ID and the flag indicating that a durability status of an encrypted second level key is required; and
determine, based on a notification received from an API of the KMS, whether the encrypted second level key meets the user-selected level of durability of the encrypted second level key.

* * * * *